(12) United States Patent  
Itoh et al.

(10) Patent No.: US 12,084,065 B2  
(45) Date of Patent: Sep. 10, 2024

(54) MANAGER, VEHICLE CONTROL METHOD, NON-TRANSITORY STORAGE MEDIUM, AND VEHICLE

(71) Applicants: TOYOTA JIDOSHA KABUSHIKI KAISHA, Toyota (JP); ADVICS CO., LTD., Kariya (JP)

(72) Inventors: Nobuyuki Itoh, Toyota (JP); Shunsuke Arakawa, Miyoshi (JP); Shogi Fukukawa, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 253 days.

(21) Appl. No.: 17/696,018

(22) Filed: Mar. 16, 2022

(65) Prior Publication Data  
US 2022/0297702 A1 Sep. 22, 2022

(30) Foreign Application Priority Data  
Mar. 18, 2021 (JP) ................................. 2021-044507

(51) Int. Cl.  
*B60W 40/105* (2012.01)  
*B60W 40/09* (2012.01)  
*B60W 50/08* (2020.01)  
*B60W 50/10* (2012.01)

(52) U.S. Cl.  
CPC .......... *B60W 40/105* (2013.01); *B60W 40/09* (2013.01); *B60W 50/082* (2013.01); *B60W 50/10* (2013.01); *B60W 2540/30* (2013.01)

(58) Field of Classification Search  
CPC .. B60W 40/105; B60W 40/09; B60W 50/082; B60W 50/10; B60W 2540/30; B60W 50/0098; B60W 2050/0042; B60W 2050/0064; B60W 2050/0075; B60W 2556/55; B60W 30/188; B60W 50/06; B60W 10/04; B60W 10/18  
See application file for complete search history.

(56) References Cited

U.S. PATENT DOCUMENTS

| | | | |
|---|---|---|---|
| 11,383,729 B2 * | 7/2022 | Sakai ..................... | B60W 10/06 |
| 11,834,037 B2 * | 12/2023 | Dakemoto ............ | B60W 50/00 |
| 2004/0034460 A1 * | 2/2004 | Folkerts ............ | B60W 50/0097 |
| | | | 701/54 |
| 2008/0140283 A1 * | 6/2008 | Kuwahara ............. | F02D 11/105 |
| | | | 701/36 |

(Continued)

FOREIGN PATENT DOCUMENTS

| | | |
|---|---|---|
| EP | 3617017 A1 | 3/2020 |
| EP | 3617019 A1 | 3/2020 |

(Continued)

*Primary Examiner* — Kurt Philip Liethen  
(74) *Attorney, Agent, or Firm* — Oliff PLC (57) ABSTRACT

A manager includes one or more processors. The one or more processors are configured to receive a plurality of first kinematic plans from a plurality of electronic control units in each of which is implemented an advanced driver assistance system application function, receive a second kinematic plan following at least one of the first kinematic plans, arbitrate the first kinematic plans, calculate one or more motion requests based on an arbitration result, and output the one or more motion requests to one or more actuator systems.

7 Claims, 4 Drawing Sheets

(56) References Cited

U.S. PATENT DOCUMENTS

| | | | |
|---|---|---|---|
| 2011/0066344 A1* | 3/2011 | Niwa | B60W 10/184 |
| | | | 701/70 |
| 2016/0236675 A1* | 8/2016 | Baba | B60K 6/50 |
| 2020/0070849 A1 | 3/2020 | Suzuki et al. | |
| 2020/0070873 A1 | 3/2020 | Itabashi | |
| 2020/0279443 A1 | 9/2020 | Kagami et al. | |
| 2021/0171052 A1* | 6/2021 | Sakai | B60W 30/1882 |
| 2021/0237748 A1* | 8/2021 | Dakemoto | B60W 50/0098 |
| 2021/0291821 A1* | 9/2021 | Dakemoto | B60W 30/09 |
| 2022/0058020 A1 | 2/2022 | Ueta et al. | |

FOREIGN PATENT DOCUMENTS

| | | |
|---|---|---|
| JP | 2014-088066 A | 5/2014 |
| JP | 2020-032893 A | 3/2020 |
| JP | 2020-032894 A | 3/2020 |
| JP | 2020-128117 A | 8/2020 |
| JP | 2020-138641 A | 9/2020 |
| WO | 2019/033025 A1 | 2/2019 |

* cited by examiner

MANAGER, VEHICLE CONTROL METHOD, NON-TRANSITORY STORAGE MEDIUM, AND VEHICLE

CROSS-REFERENCE TO RELATED APPLICATION

This application claims priority to Japanese Patent Application No. 2021-044507 filed on Mar. 18, 2021, incorporated herein by reference in its entirety.

BACKGROUND

1. Technical Field

The present disclosure relates to a manager for controlling an actuator installed in a vehicle, a vehicle control method, a non-transitory storage medium, and a vehicle.

2. Description of Related Art

Japanese Unexamined Patent Application Publication No. 2020-032893 (JP 2020-032893 A) describes an example of a control device that controls an actuator installed in a vehicle based on a request from a driver assistance system that assists driving by a driver. The control device described in JP 2020-032893 A receives a request regarding lateral-direction motion of the vehicle from the driver assistance system, and distributes the received request to one or more actuators.

SUMMARY

Some of a plurality of actuators installed in the vehicle have slow responsivity. There have been cases in which attempts to immediately realize requests from the driver assistance system are not carried out in vehicle control as requested by the system, due to the response delay of the actuator, and accordingly there has been room for improvement.

The present disclosure provides a manager, a vehicle control method, a non-transitory storage medium, and a vehicle, which are capable of improving response of actuators as to kinematic plans of the driver assistance system.

A manager according to a first aspect of the present disclosure includes one or more processors. The one or more processors are configured to receive a plurality of first kinematic plans from a plurality of electronic control units in each of which is implemented an advanced driver assistance system application function, and receive a second kinematic plan following at least one of the first kinematic plans. The one or more processors are configured to arbitrate the first kinematic plans. The one or more processors are configured to calculate one or more motion requests based on an arbitration result. The one or more processors are configured to output the one or more motion requests to one or more actuator systems.

In the manager according to the first aspect of the present disclosure, the one or more processors may be configured to, when the one or more actuator systems include an actuator system of which an operating state needs to be switched, output, beforehand, a motion request to the actuator system of which the operating state needs to be switched. The motion request may be included in the one or more motion requests. In the manager according to the first aspect of the present disclosure, the one or more processors may be configured to output, beforehand, a motion request to the actuator system of which the operating state needs to be switched, based on the second kinematic plan. The motion request may be included in the one or more motion requests. In the manager according to the first aspect of the present disclosure, the one or more processors may be configured to output, beforehand, the motion request for the actuator system of which the operating state needs to be switched, based on responsivity information of the actuator system. The manager according to the first aspect of the present disclosure may further include a storage configured to store the responsivity information. In the manager according to the first aspect of the present disclosure, the one or more processors may be configured to receive the responsivity information from the actuator system. In the manager according to the first aspect of the present disclosure, the responsivity information may be updatable by Over the Air. In the manager according to the first aspect of the present disclosure, the one or more processors may be configured to request at least one of the electronic control units in each of which is implemented the advanced driver assistance system application function for the second kinematic plan.

A vehicle control method according to a second aspect of the present disclosure is executed by a computer including a processor, a memory, and a storage device. The vehicle control method includes receiving a plurality of first kinematic plans from a plurality of electronic control units in each of which is implemented an advanced driver assistance system application function, receiving a second kinematic plan following at least one of the first kinematic plans from the electronic control units, arbitrating the first kinematic plans, calculating one or more motion request based on an arbitration result, and distributing the one or more motion requests to one or more actuator systems.

A non-transitory storage medium according to a third aspect of the present disclosure stores instructions that are executable by a computer that includes one or more processors, a memory, and a storage device, the instructions causing the computer to perform functions. The functions include receiving a plurality of first kinematic plans from a plurality of electronic control units in each of which is implemented an advanced driver assistance system application function, receiving a second kinematic plan following at least one of the first kinematic plans from the electronic control units, arbitrating the first kinematic plans, calculating one or more motion requests based on an arbitration result, and distributing the one or more motion requests to one or more actuator systems.

Further, a vehicle according to a fourth aspect of the present disclosure includes the manager.

According to the present disclosure, a manager, a vehicle control method, a non-transitory storage medium, and a vehicle having the manager, which are capable of improving response of actuators as to kinematic plans of the driver assistance system, can be provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
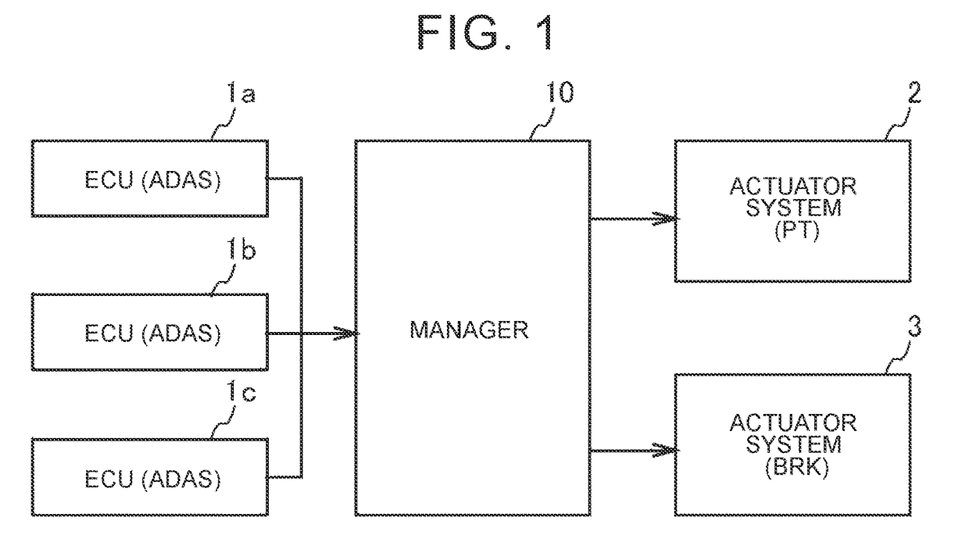
FIG. 1 is a block diagram illustrating a schematic configuration of a vehicle control system according to an embodiment.

FIG. 1 is a block diagram illustrating a schematic configuration of a vehicle control system according to an embodiment.

The vehicle control system illustrated in FIG. 1 is a system for controlling motion of a vehicle, and includes a plurality of ECUs 1a to 1c, a manager 10, and actuator systems 2 and 3.

The ECUs 1a to 1c are electronic control units (ECUs) in which are implemented advanced driver assistance system (ADAS) application functions, and are devices that realize driver assistance functions of vehicles, such as automatic driving, automatic parking, adaptive cruise control, lane keeping assistance, collision mitigation braking, and so forth, by executing ADAS applications. The ECUs 1a to 1c include a processor such as a central processing unit (CPU), a memory, and a non-volatile memory for storing ADAS applications. The ECUs 1a to 1c output a first kinematic plan, and a second kinematic plan that is a future kinematic plan following the first kinematic plan, to the manager 10, to execute various types of vehicle control functions. Kinematic plans include, for example, longitudinal acceleration (requested acceleration) as information representing the motion of the vehicle in the front-rear direction. Also, kinematic plans may include information representing lateral-direction motion of the vehicle, and the steering angle, yaw rate, radius of curvature, and so forth, can be used as information representing lateral-direction motion. Note that in FIG. 1, three ECUs 1a to 1c are illustrated for the sake of brevity of description, but the number of ECUs in which ADAS application functions are implemented is not limited, and may be two or less, or four or more.

The manager 10 arbitrates kinematic plans output from the ECUs 1a to 1c, and distributes motion requests to at least one of the actuator systems 2 and 3 based on the arbitration results. The manager 10 includes one or more processors, and may be configured as an ECU independent of other ECUs, may be installed in any other ECU, or may be integrally configured with any other ECU. Details of the manager 10 will be described later.

The actuator system 2 includes a powertrain (PT) and a powertrain ECU that controls the powertrain. The powertrain ECU controls the braking/driving force generated in the powertrain based on motion requests output from the manager 10. Note that in the present specification, "braking/driving force" is used as a collective term for braking force and driving force. Braking force is a negative driving force.

The actuator system 3 includes brakes (BRK) and a brake ECU that controls the brakes. The brake ECU controls the braking force generated in the brakes based on the motion request output from the manager 10.

Figure 2:
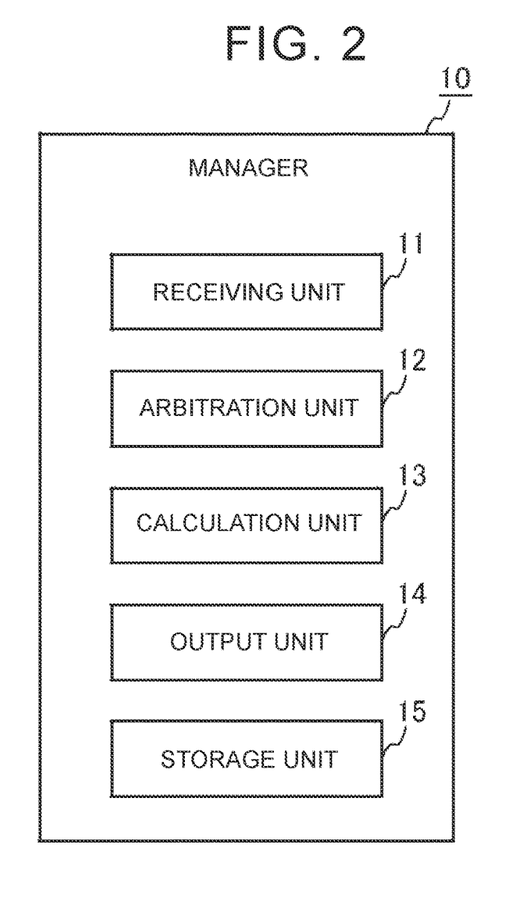
FIG. 2 is a functional block diagram of the manager illustrated in FIG. 1.

FIG. 2 is a functional block diagram of the manager illustrated in FIG. 1.

The manager 10 includes a receiving unit 11, an arbitration unit 12, a calculation unit 13, an output unit 14, and a storage 15.

The receiving unit 11 receives the first kinematic plan and the second kinematic plan following the first kinematic plan from the ECUs 1a to 1c. The receiving unit 11 can receive a plurality of first kinematic plans and a plurality of second kinematic plans.

The arbitration unit 12 arbitrates the first kinematic plans and the second kinematic plans received by the receiving unit 11. As arbitration processing, the arbitration unit 12 selects one kinematic plan from the received kinematic plans based on, for example, a predetermined selection criterion, sets an allowable range of control based on the received kinematic plans, or the like.

The calculation unit 13 calculates a motion request for one or both of the actuator systems 2 and 3 based on the arbitration results from the arbitration unit 12. For example, the calculation unit 13 calculates a target driving force of the powertrain and a target braking force of the brakes, using the longitudinal acceleration (requested acceleration) included in the first kinematic plan selected by the arbitration. The calculation unit 13 may calculate the target driving torque of the drive shaft instead of the target driving force, or may calculate the braking torque of the brakes instead of the target braking force. The calculation unit 13 performs feedforward (FF) control and feedback (FB) control in calculating the motion request (target braking/driving force) for realizing the requested acceleration received as the first kinematic plan. The calculation unit 13 uses the target braking/driving force calculated based on the requested acceleration as an FF term, and calculates the target braking/driving force to be output to at least one of the actuator systems 2 and 3 by taking into consideration an FB term.

The output unit 14 distributes the motion request calculated by the calculation unit 13 to at least one of the actuator systems 2 and 3. The output unit 14 determines whether the operating state of the actuator system needs to be switched in order to achieve the second kinematic plan, based on the first kinematic plan and the second kinematic plan received by the receiving unit 11. For example, the output unit 14 determines whether switching between a state in which the powertrain actuator system is generating driving force and a state of not generating driving force (including a state in which braking force is being generated) is necessary, and whether switching between a state in which the brake actuator system is generating braking force and a state of not generating braking force is necessary, based on the difference between the requested acceleration received as the first kinematic plan and the final requested acceleration received as the second kinematic plan, and the respective signs of the requested acceleration and the final requested acceleration. When the operating state of the actuator system needs to be switched, the output unit 14 outputs the motion request calculated by the calculation unit 13 to the actuator system of which the operating state needs to be switched, beforehand. Details of the processing performed by the output unit 14 will be described later.

The storage 15 stores responsivity information of each of the actuator systems 2 and 3. The responsivity information is, for example, a response delay time DT of each actuator system. The response delay time DT can be defined as the time from when the motion request (target braking/driving force) is output to each actuator system, until the braking/driving force is generated. The response delay time DT may be a value obtained beforehand by experimentation or the like for each vehicle type, may be a uniform fixed value, or may be held as a map associated with other parameters.

FIGS. 3A through 3D are diagrams showing a control method of actuator systems, according to a reference example.

Figure 3A:
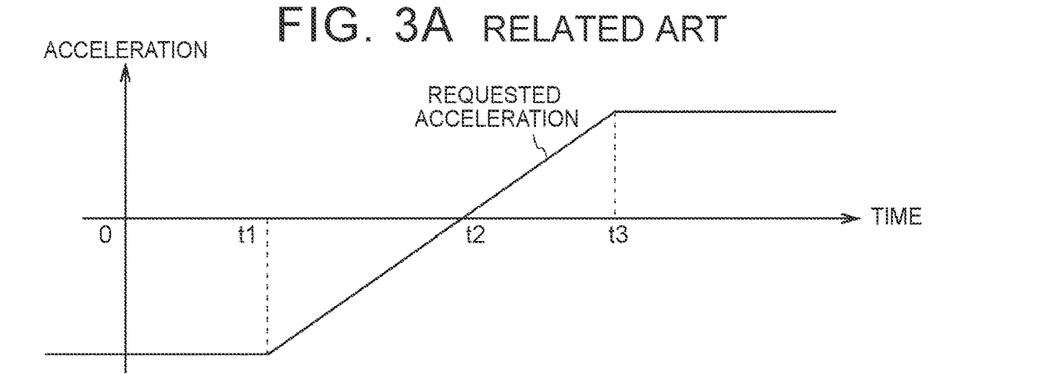
FIG. 3A is a diagram showing a control method of actuators according to a reference example.

FIG. 3A shows the change over time of the requested acceleration output as a kinematic plan from the ECU in which the ADAS application function is implemented. In the example of FIG. 3A, the requested acceleration of the vehicle turns positive at time t2, and reaches a final requested acceleration at time 3.

Figure 3B:
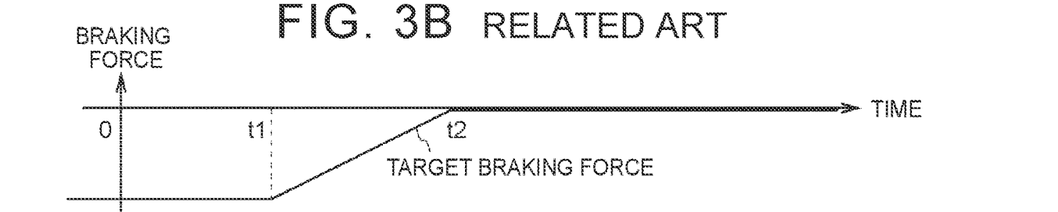
FIG. 3B is a diagram showing the control method of the actuators according to the reference example.

FIG. 3B shows the change over time of the target braking force (negative driving force) for realizing the kinematic request shown in FIG. 3A. As shown in FIG. 3B, the target braking force linearly decreases from time t1 to time t2 in response to the increase in the requested acceleration, and the target braking force becomes zero after time 2.

Figure 3C:
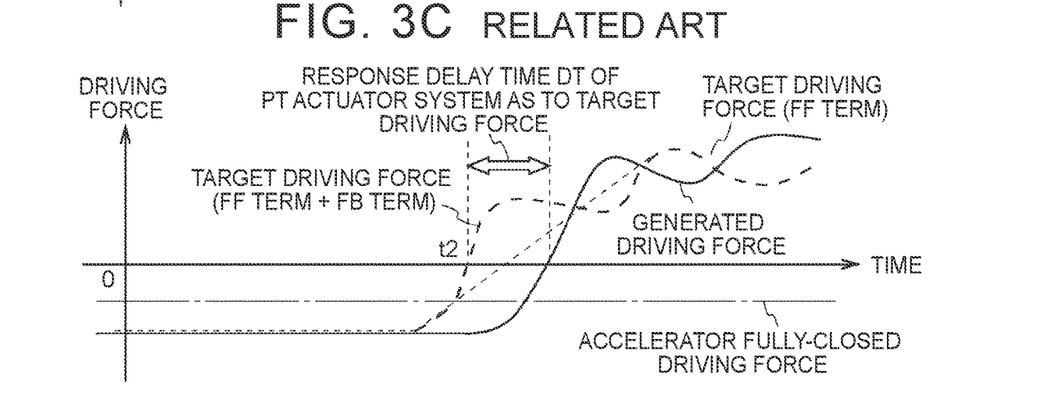
FIG. 3C is a diagram showing the control method of the actuators according to the reference example.

FIG. 3C shows the change over time of the target braking/driving force for realizing the kinematic request shown in FIG. 3A. In FIG. 3C, a short-dashed line represents the target braking/driving force (FF term) calculated based on the requested acceleration, and a long-dashed line represents the target driving force (output value to the actuator system) that takes into consideration the FF term and the FB term.

A situation will be assumed in which, in a state of the driving force generated by the powertrain actuator system due to the execution of fuel-cut or the like being no greater than the driving force when the accelerator pedal is not depressed (hereinafter referred to as "accelerator fully-closed driving force"), a target driving force greater than the accelerator fully-closed driving force is generated. Due to the poor responsivity of the powertrain actuator system, there is a delay equivalent to the response delay time DT in generating of the driving force (continuous line) by the powertrain actuator system as compared to the target driving force indicated by the long-dashed line. When the generated driving force is insufficient, due to the response delay of the power train actuator system, the target driving force is adjusted to be higher by the feedback control, following which the generated driving force of the powertrain actuator system suddenly increases. When the generated driving force of the powertrain actuator system suddenly increases, the target driving force is adjusted to be lower, and accordingly the generated driving force of the powertrain actuator system is reduced belatedly thereafter. Subsequently, the target driving force (long-dashed line) and the generated driving force (continuous line) repeat alternately increasing and decreasing in accordance with the feedback control.

Figure 3D:
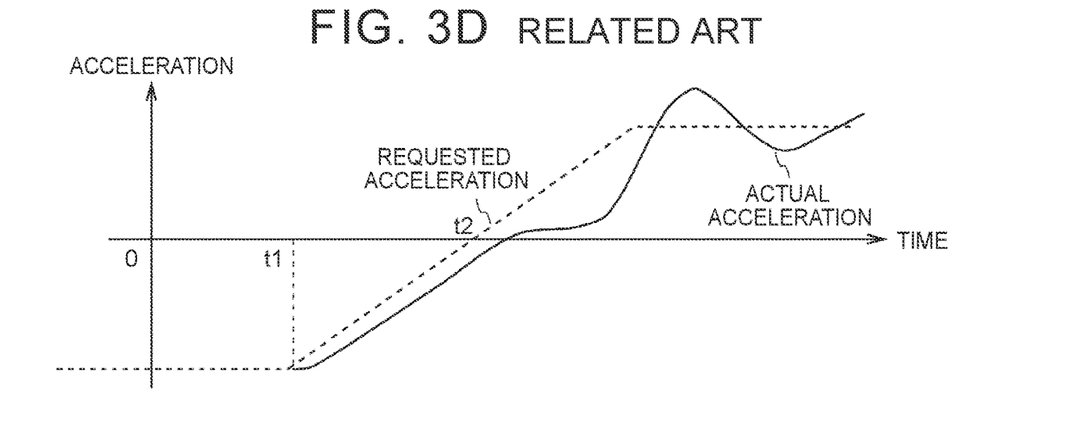
FIG. 3D is a diagram showing the control method of the actuators according to the reference example.

As a result, as shown in FIG. 3D, the actual acceleration of the vehicle increases and decreases as to the requested acceleration output as a kinematic request from the ADAS application, and time is needed for the actual acceleration to converge, which may lead to deterioration of riding comfort.

Conversely, the manager 10 according to the present embodiment can receive the first kinematic plan and the second kinematic plan following the first kinematic plan from the ECUs 1a to 1c, and accordingly the first kinematic plan and the second kinematic plan can be used to improve the response of the actuator system. The manager 10 determines whether the actuator systems include an actuator system of which the operating state needs to be switched, based on the first kinematic plan and the second kinematic plan that is the future kinematic plan following the first kinematic plan. When the actuator systems include the actuator system of which the operating state needs to be switched, the manager 10 resolves the response delay of the actuator system to be switched, by outputting, beforehand, a motion request for the actuator system of which the operating state needs to be switched. Control of the manager 10 according to the present embodiment will be described below with reference to FIGS. 4A through 4D.

FIGS. 4A through 4D are diagrams showing a control method of actuator systems performed by the manager according to the embodiment.

Figure 4A:
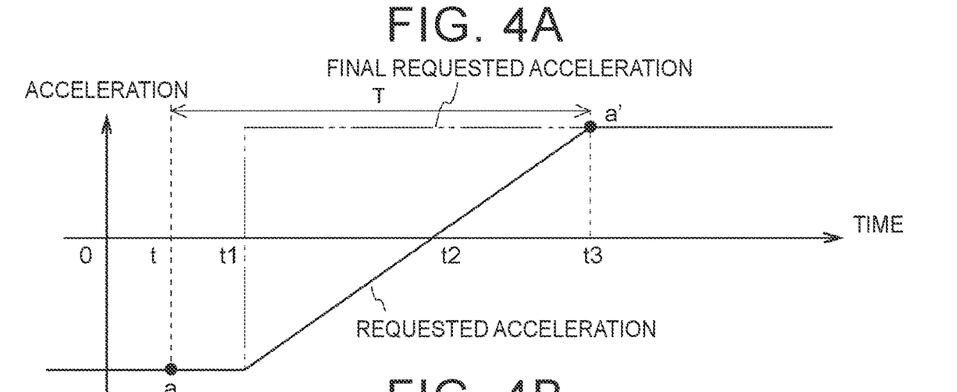
FIG. 4A is a diagram showing a control method of actuators performed by the manager according to the embodiment.

FIG. 4A shows the change over time of the requested acceleration received by the receiving unit 11 of the manager 10 as the first kinematic plan, and the final requested acceleration received as the second kinematic plan. In the example of FIG. 4A, the requested acceleration of the vehicle turns positive at time t2 in the same way as in the example in FIG. 3A, and reaches the final requested acceleration at time t3. It is sufficient for the second kinematic plan to be at a predetermined time following the first kinematic plan, and the time difference between the first kinematic plan and the second kinematic plan can be set as appropriate. For example, the receiving unit 11 of the manager 10 can receive a requested acceleration (a) as the first kinematic plan at time t, and also receive a final requested acceleration (a') at time t3 as the second kinematic plan following an amount of time T from the first kinematic plan.

Figure 4B:
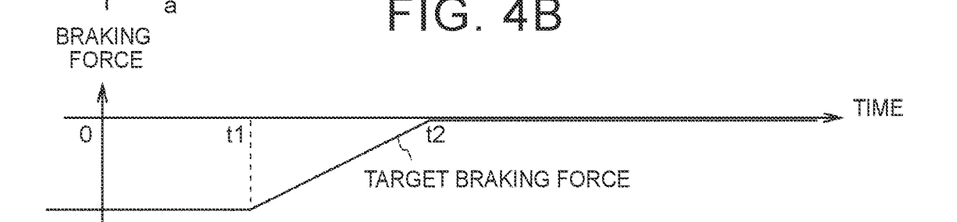
FIG. 4B is a diagram showing the control method of the actuators performed by the manager according to the embodiment.

FIG. 4B shows the change over time of the target braking force (negative driving force) for realizing the kinematic request shown in FIG. 4A. As shown in FIG. 4B, the target braking force linearly decreases from time t1 to time t2 in response to the increase in the requested acceleration, and the target braking force becomes zero after time t2.

Figure 4C:
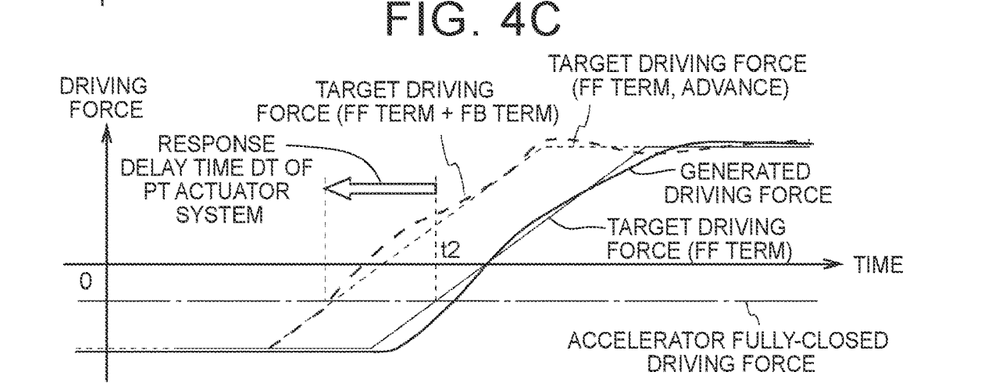
FIG. 4C is a diagram showing the control method of the actuators performed by the manager according to the embodiment.

FIG. 4C shows the change over time of the target driving force for realizing the kinematic request shown in FIG. 4A. In FIG. 4C, the thin continuous line represents the target driving force (FF term) calculated based on the requested acceleration. The target driving force (FF term, advance) represented by a short-dashed line is the target driving force (FF term) calculated based on the requested acceleration, which is output in advance a predetermined time before the target driving force (FF term). In other words, the target driving force (FF term, advance) of the short-dashed line corresponds to the target driving force (FF term) of the thin continuous line shifted in the negative direction on the horizontal axis by a predetermined amount of time. The long-dashed line represents the target driving force in which the FB term is added to the target driving force (FF term, advance).

The calculation unit 13 of the manager 10 calculates the target driving force (FF term) based on the requested acceleration based on the first kinematic plan (thin continuous line in FIG. 4C). In order to realize the final requested acceleration shown in FIG. 4A, changing the operating state of the powertrain actuator system from a state in which braking force is generated to a state in which driving force is generated is necessary. Accordingly, the output unit 14 of the manager 10 outputs in advance the target driving force, calculated by the calculation unit 13, to the powertrain actuator system that has poor responsivity, by an amount of time equivalent to the response delay time DT of the actuator system (target driving force represented by the short-dashed line in FIG. 4C (FF term, advance)). When a target driving force greater than the accelerator fully closed driving force is generated in a state in which the generated driving force of the powertrain actuator system is no greater than the accelerator fully closed driving force due to execution of fuel-cut or the like, a delay in the generation of driving force by the powertrain actuator system occurs, due to the responsivity of the powertrain actuator system being poor. However, the target driving force (target driving force represented by the long-dashed line (FF term+FB term)) output to the powertrain actuator system is calculated based on the target driving force (FF term, advance) obtained by shifting the target driving force (FF term), calculated based on the requested driving force, earlier by a predetermined amount of time, with the response delay time DT of the powertrain actuator system taken into consideration beforehand. Accordingly, the shortage of the generated driving force (thick continuous line) with respect to the target driving force (FF term) calculated based on the requested acceleration can be reduced. According to this control, the difference between the generated driving force of the powertrain actuator system and the target driving force is reduced, and thus increase or decrease in the generated driving force of the powertrain actuator system due to feedback control can be suppressed.

Figure 4D:
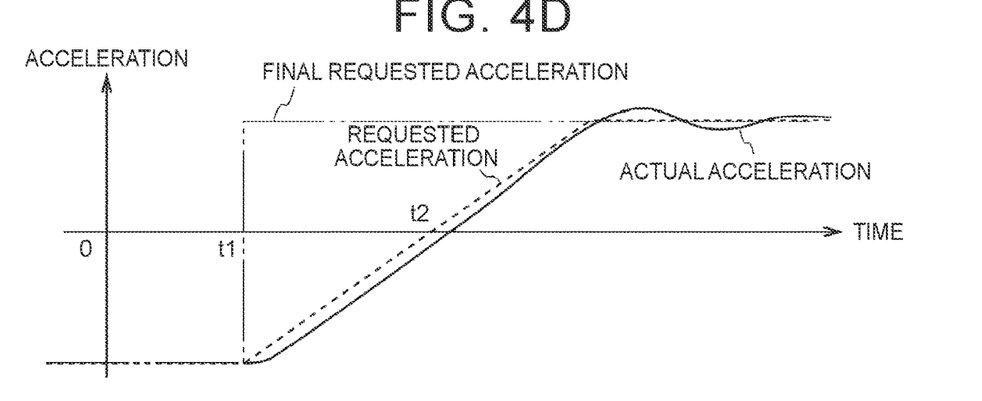
FIG. 4D is a diagram showing the control method of the actuators performed by the manager according to the embodiment.

As a result, as shown in FIG. 4D, the increase or decrease in the actual acceleration of the vehicle can be suppressed with respect to the requested acceleration output as the first kinematic request from the ADAS application, and the convergence of the actual acceleration can be improved, and accordingly the ride comfort can be improved.

Figure 5:
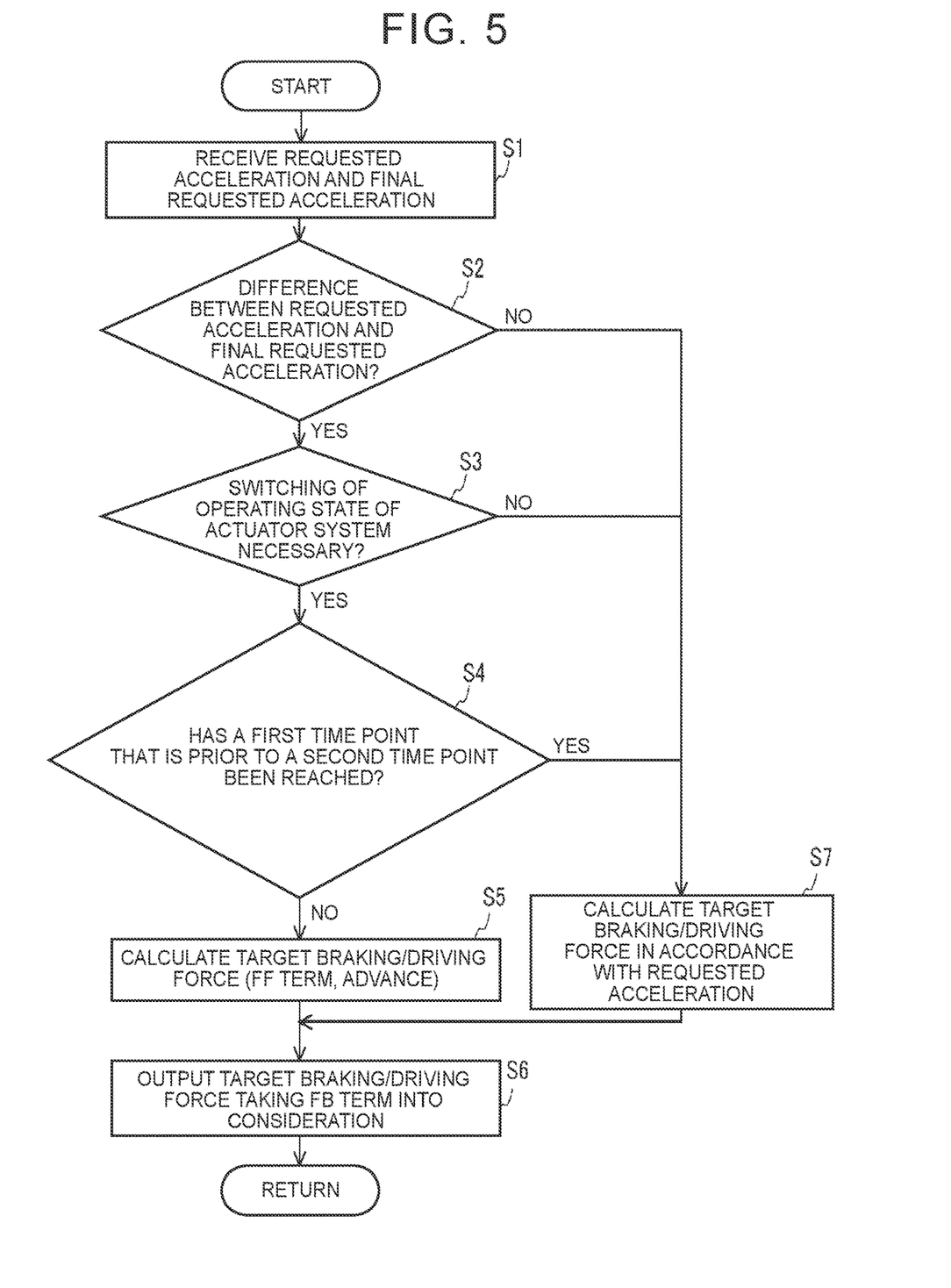
FIG. 5 is a flowchart showing control processing performed by the manager according to the embodiment.

FIG. 5 is a flowchart showing control processing performed by the manager according to the embodiment. The control processing in FIG. 5 is repeatedly executed during the execution of the ADAS application function.

In step S1, the receiving unit 11 receives the requested acceleration as the first kinematic plan, and the final requested acceleration as the second kinematic plan, from the ECUs 1a to 1c. Upon the receiving unit 11 receiving the first kinematic plan and the second kinematic plan, the arbitration unit 12 performs arbitration processing, and the calculation unit 13 calculates the motion request for the actuator systems 2 and 3 based on the arbitration results. Thereafter, the processing proceeds to step S2.

In step S2, the calculation unit 13 determines whether there is a difference between the requested acceleration and the final requested acceleration. The output unit 14 may determine that there is a difference in step S2, when the difference between the requested acceleration and the final requested acceleration is not less than a predetermined threshold value. When the determination in step S2 is YES, the processing proceeds to step S3, and otherwise, the processing proceeds to step S7 to calculate the target braking/driving force in accordance with the requested acceleration.

In step S3, the calculation unit 13 determines whether the operating state of the actuator system 2 or 3 needs to be switched. This determination can be made, for example, based on the difference between the requested acceleration and the final requested acceleration and the sameness of signs. When the determination is YES in step S3, the processing proceeds to step S4, and otherwise, the processing proceeds to step S7. Note that the processing of steps S4 and S6 may have already been executed before the determination in step S2. Accordingly, when NO is determined in step S2, the processing may proceed to step S7.

In step S4, the calculation unit 13 determines whether a first time point that is prior to a second time point has been reached. The second time point is a time point at which the requested acceleration is predicted to reach the final requested acceleration. The first time point is prior to the second time point by the response delay time (DT) of the actuator system. That is, the time difference between the first time point and the second time point is the response delay time (DT). When the determination is YES in step S4, the processing proceeds to step S7, and otherwise, the processing proceeds to step S5.

In step S5, the calculation unit 13 calculates the target braking/driving force (FF term, advance), in which the motion request (FF term of the target braking/driving force) calculated by the calculation unit 13 in step S1 is shifted to be earlier than the predicted switching time of the operation state that is identified based on the requested acceleration, by a predetermined amount of time. The response delay time DT of the actuator system described above may be used for the predetermined time. Thereafter, the processing proceeds to step S6.

In step S6, the calculation unit 13 calculates the target braking/driving force for output, taking the FB term into consideration in the target braking/driving force calculated in step S5 or step S7. The output unit 14 outputs the target braking/driving force calculated by the calculation unit to the actuator system of which the operating state needs to be switched, and the processing of this flowchart ends.

When determination is made that the actuator systems include an actuator system of which the operating state needs to be switched, based on the requested acceleration and the final requested acceleration by performing the control processing shown in FIG. 5, the target braking/driving force can be output beforehand, taking into consideration the operation delay of the actuator system. As a result, the capabilities of the actual acceleration to follow the requested acceleration can be improved, and deterioration of comfort of the ride can be suppressed.

As described above, the manager 10 according to the present embodiment receives the first kinematic plan and the second kinematic plan following the first kinematic plan, from the ECUs 1a to 1c in each of which is implemented the ADAS application function. Thus, the manager 10 can comprehend the future kinematic plans, and can perform control that takes into consideration the response delay of the actuator system.

Further, when the actuator systems include an actuator system of which the operating state needs to be switched, the output unit 14 outputs, beforehand, a motion request for the actuator system of which the operating state needs to be switched. Accordingly, even when the responsivity of the actuator system of which the operating state needs to be switched is poor, delay in generating the braking/driving force by the actuator system can be suppressed.

Further, the output unit 14 outputs, beforehand, a motion request for the actuator system of which the operating state needs to be switched, based on the future requested acceleration (final requested acceleration) received as the second kinematic plan. Thus, output of motion requests that exceed the second kinematic plan that is the future kinematic plan can be suppressed.

Further, the output unit 14 controls the timing of advance output of the motion request to the actuator system of which the operating state needs to be switched, based on the responsivity information of the actuator system of which the operating state needs to be switched. Accordingly, the response delay can be appropriately suppressed in accordance with the operating characteristics of the actuator system.

OTHER MODIFICATIONS

In the above embodiment, an example in which responsivity information is stored in the storage of the manager has been described, but a second receiving unit that receives the responsivity information from the actuator system may be provided. The responsivity information received from the actuator system by the second receiving unit may be stored in the storage.

Also, when the responsivity information is stored in the storage of the manager, the responsivity information in the storage may be updated by Over the Air (OTA). For example, an arrangement is conceivable in which the software that the ECU of the actuator system has is updated by OTA to improve functions. When the responsivity of the actuator system changes due to updating of the software of the actuator system, the responsivity information stored in the storage of the manager may be updated as well. In this case, the manager may download the update data by communicating with a server of a center, or an OTA master that controls the software updating of the entire vehicle may download the update data by communicating with the server, and transfer the update data to the manager.

Also, in the above embodiment, an example has been described in which the ECU in which the ADAS application function is implemented outputs the first kinematic plan and the second kinematic plan following the first kinematic plan to the manager. An output unit (second output unit) may be provided in the manager, to request the electronic control unit in which is implemented the ADAS application function for the second kinematic plan, when the ECU that implements the ADAS application function is not designed to spontaneously output the second kinematic plan that is the future kinematic plan.

The functions of the manager exemplified in the above embodiment can also be realized as a vehicle control method executed by a computer including one or more processors (CPU), a memory, and a storage device, a vehicle control program executed by the computer, or a computer-readable non-transitory storage medium that stores the vehicle control program.

The present disclosure is applicable to a manager for controlling an actuator system and a vehicle provided therewith.

What is claimed is:

1. A vehicle comprising:
a plurality of electronic control units in each of which is implemented an advanced driver assistance system application function;
a plurality of actuator systems configured to cause motion of the vehicle in at least one of a front-rear direction of the vehicle and a lateral direction of the vehicle; and
a manager coupled to the plurality of electronic control units and to the plurality of actuator systems, the manager including one or more processors configured to:
receive a plurality of first kinematic plans from the plurality of electronic control units, the first kinematic plans relating to the motion of the vehicle,
receive a second kinematic plan relating to the motion of the vehicle, the second kinematic plan starting at a second time that is after a first time at which least one of the first kinematic plans starts,
arbitrate the first kinematic plans,
calculate one or more motion requests based on an arbitration result,
determine whether the one or more actuator systems include an actuator system having an operating state that needs to be switched in order to achieve the second kinematic plan based on the arbitration results and the second kinematic plan,
when the one or more actuator systems include the actuator system having the operating state that needs to be switched, advance a start timing of a motion request among the one or more motion requests that is to be output to the actuator system having the operating state that needs to be switched, and
output the one or more motion requests to the one or more actuator systems, and
wherein the one or more actuator systems control the vehicle according to the one or more motion requests that are output.

2. The vehicle according to claim 1, wherein the one or more processors are configured to advance the start timing by an amount that is based on responsivity information of the actuator system having the operating state that needs to be switched.

3. The vehicle according to claim 2, further comprising a storage configured to store the responsivity information.

4. The vehicle according to claim 2, wherein the one or more processors are configured to receive the responsivity information from the actuator system having the operating state that needs to be switched.

5. The vehicle according to claim 3, wherein the responsivity information stored in the storage is updatable by Over the Air.

6. The vehicle according to claim 1, wherein the one or more processors are configured to request at least one of the electronic control units for the second kinematic plan.

7. A vehicle control method of a vehicle that includes (i) a plurality of electronic control units in each of which is implemented an advanced driver assistance system application function; (ii) a plurality of actuator systems configured to cause motion of the vehicle in at least one of a front-rear direction of the vehicle and a lateral direction of the vehicle; and (iii) a computer coupled to the plurality of electronic control units and to the plurality of actuator systems, the computer including one or more processors, a memory, and a storage device, the vehicle control method comprising:
receiving, by the computer, a plurality of first kinematic plans from the plurality of electronic control units, the first kinematic plans relating to the motion of the vehicle;
receiving, by the computer, a second kinematic plan relating to the motion of the vehicle, the second kinematic plan starting at a second time that is after a first time at which at least one of the first kinematic plans starts;
arbitrating, by the computer, the first kinematic plans;
calculating, by the computer, one or more motion requests based on an arbitration result;
determining, by the computer, whether the one or more actuator systems include an actuator system having an operating state that needs to be switched in order to achieve the second kinematic plan based on the arbitration results and the second kinematic plan;
when the one or more actuator systems include the actuator system having the operating state that needs to be switched, the computer advancing a start timing of a motion request among the one or more motion requests that is to be output to the actuator system having the operating state that needs to be switched;

distributing, by the computer, the one or more motion requests to the one or more actuator systems; and the one or more actuator systems controlling the vehicle according to the one or more motion requests that have been distributed to the one or more actuator systems.

\* \* \* \* \*